US 12,386,145 B2

(12) United States Patent
Hsu et al.

(10) Patent No.: US 12,386,145 B2
(45) Date of Patent: *Aug. 12, 2025

(54) OPTICAL SYSTEM

(71) Applicant: TDK TAIWAN CORP., Taoyuan (TW)

(72) Inventors: Chan-Jung Hsu, Taoyuan (TW); I-Mei Huang, Taoyuan (TW); Yi-Ho Chen, Taoyuan (TW); Shao-Chung Chang, Taoyuan (TW); Ichitai Moto, Taoyuan (TW); Chen-Chi Kuo, Taoyuan (TW); Ying-Jen Wang, Taoyuan (TW); Ya-Hsiu Wu, Taoyuan (TW); Wei-Jhe Shen, Taoyuan (TW); Chao-Chang Hu, Taoyuan (TW); Che-Wei Chang, Taoyuan (TW); Sin-Jhong Song, Taoyuan (TW); Shu-Shan Chen, Taoyuan (TW); Chih-Wei Weng, Taoyuan (TW); Chao-Hsi Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 60 days.

This patent is subject to a terminal disclaimer.

(21) Appl. No.: 18/344,154

(22) Filed: Jun. 29, 2023

(65) Prior Publication Data
US 2023/0341654 A1 Oct. 26, 2023

Related U.S. Application Data

(63) Continuation of application No. 17/155,964, filed on Jan. 22, 2021, now Pat. No. 11,829,001.
(Continued)

(51) Int. Cl.
*G02B 7/09* (2021.01)
*G02B 27/64* (2006.01)

(52) U.S. Cl.
CPC ............. *G02B 7/09* (2013.01); *G02B 27/646* (2013.01)

(58) Field of Classification Search
CPC ...... G02B 15/173; G02B 15/14; G02B 15/22; G02B 15/16; G02B 15/177; G02B 15/15;
(Continued)

(56) References Cited

U.S. PATENT DOCUMENTS 7,519,282 B2   4/2009   Shin et al.
10,928,559 B2*  2/2021   Wang ....................... G02B 7/08
(Continued)

FOREIGN PATENT DOCUMENTS

CN      110352371 A      10/2019
JP      2017003934 A     1/2017
(Continued)

OTHER PUBLICATIONS

Extended Search Report dated Apr. 26, 2024 issued in counterpart European Application No. 23211699.6 (full English text).
(Continued)

*Primary Examiner* — Stephone B Allen
*Assistant Examiner* — Tamara Y. Washington
(74) *Attorney, Agent, or Firm* — MUNCY, GEISSLER, OLDS & LOWE, PC

(57) ABSTRACT

An optical system includes an optical module with a main axis is provided. The optical module includes a fixed portion, a movable portion, and a driving mechanism. The movable portion is connected to an optical element and is movable relative to the fixed portion. The driving mechanism drives the movable portion to move relative to the fixed portion. When viewed along a direction that is parallel with the main axis, the fixed portion is a polygonal structure with a first side, a second side, a third side, and a fourth side. The first side is parallel with the third side, the second side is
(Continued)

parallel with the fourth side, and the first side is not parallel with the second side.

19 Claims, 15 Drawing Sheets

Related U.S. Application Data

(60) Provisional application No. 63/121,415, filed on Dec. 4, 2020, provisional application No. 63/058,932, filed on Jul. 30, 2020, provisional application No. 63/056,183, filed on Jul. 24, 2020, provisional application No. 63/017,313, filed on Apr. 29, 2020, provisional application No. 62/964,377, filed on Jan. 22, 2020.

(58) Field of Classification Search
CPC ........ G02B 15/17; G02B 15/20; G02B 15/10; G02B 15/163; G02B 15/167; G02B 15/12; G02B 15/161; G02B 7/08; G02B 7/09; G02B 7/04; G02B 7/022; G02B 7/102; G02B 7/14; G02B 7/023; G02B 7/02; G02B 7/032; G02B 7/021; G02B 7/025; G02B 7/18; G02B 7/24; G02B 7/28; G02B 13/18; G02B 13/009; G02B 13/02; G02B 13/0015; G02B 13/0045; G02B 13/04; G02B 13/001; G02B 13/0065; G02B 13/002; G02B 13/004; G02B 13/06; G02B 13/16; G02B 13/36; G02B 27/646; G02B 27/64; G02B 27/0025; G02B 27/0911; G02B 27/644; G02B 9/62; G02B 9/64; G02B 9/04; G02B 9/34; G02B 9/60; G02B 9/00; G02B 9/24; G02B 23/02; G02B 17/08; G02B 17/0804; G02B 17/0808; G02B 17/0896; G02B 17/02; G02B 17/04; G02B 17/14; G02B 17/12; G02B 21/26; G02B 26/004; G02B 26/0808; G02B 26/0816; G02B 3/14; G02B 3/10; G02B 3/00; G03B 5/00; G03B 5/02; G03B 5/06; G03B 2205/0015; G03B 2205/0069; G03B 2205/0023; G03B 2205/0007; G03B 2205/0046; G03B 2205/0053; G03B 2205/0092; G03B 2217/005

See application file for complete search history.

(56) References Cited

U.S. PATENT DOCUMENTS

| | | |
|---|---|---|
| 2006/0017815 A1 | 1/2006 | Stavely et al. |
| 2007/0024739 A1 | 2/2007 | Konno |
| 2008/0187301 A1 | 8/2008 | Takahashi |
| 2008/0266404 A1 | 10/2008 | Sato |
| 2010/0166401 A1 | 7/2010 | Akutsu |
| 2011/0217029 A1 | 9/2011 | Wu et al. |
| 2011/0221915 A1 | 9/2011 | Takano et al. |
| 2012/0249815 A1 | 10/2012 | Bohn et al. |
| 2015/0286033 A1 | 10/2015 | Osborne |
| 2015/0350500 A1 | 12/2015 | Gutierrez et al. |
| 2017/0242225 A1 | 8/2017 | Fiske |
| 2017/0272658 A1 | 9/2017 | Ito |
| 2018/0210163 A1* | 7/2018 | Jung .................. G03B 3/10 |
| 2018/0364446 A1 | 12/2018 | Osaka et al. |
| 2019/0058832 A1 | 2/2019 | Huang et al. |
| 2021/0165183 A1* | 6/2021 | Kameyama .......... G02B 27/646 |

FOREIGN PATENT DOCUMENTS

| | | |
|---|---|---|
| KR | 1020150071408 A | 6/2015 |
| WO | WO-2018/202819 A1 | 11/2018 |
| WO | WO-2020069391 A1 | 4/2020 |

OTHER PUBLICATIONS

Search Report of corresponding EP Application No. 23211699.6 dated Feb. 22, 2024, 19 pages.
Office Action with partial Search Report issued in corresponding EP Application No. 21152963.1 on Jun. 17,2021 (13 pages).
European Search Report mailed Oct. 11, 2021 in EP Application No. 21152963.1, 15 pages.

* cited by examiner

OPTICAL SYSTEM

CROSS REFERENCE TO RELATED APPLICATIONS

This application is a Continuation application of U.S. patent application Ser. No. 17/155,964, filed on Jan. 22, 2021, which claims the benefit of U.S. Provisional Application No. 62/964,377, filed on Jan. 22, 2020, U.S. Provisional Application No. 63/017,313, filed on Apr. 29, 2020, U.S. Provisional Application No. 63/056,183, filed on Jul. 24, 2020, U.S. Provisional Application No. 63/058,932, filed on Jul. 30, 2020, and U.S. Provisional Application No. 63/121,415, filed on Dec. 4, 2020, the entirety of which are incorporated by reference herein.

BACKGROUND OF THE INVENTION

Field of the Invention

The present invention relates to an optical system.

Description of the Related Art

As technology has developed, optical elements and optical systems, which are used for driving optical elements, have become miniaturized. Many electronic devices (such as tablet computers and smartphones) are equipped with at least one optical element, at least one optical system, and at least one light-detection element for capturing images and recording videos. When a user uses an electronic device, shock or vibration may occur, and this may cause the images or videos to come out blurry. However, as the demand for higher quality in images and videos is increasing, an optical system that is able to perform displacement-correction and shake-compensation has been developed.

The optical system may drive the optical element to move along a direction that is parallel with the optical axis to autofocus (AF) on the scene to be shot. Additionally, the optical system may also drive the optical element to move along a direction that is perpendicular to the optical axis to perform optical image stabilization (OIS), which compensates for the deviation of the image caused by shaking or impact, and solve the problem of blurry images and videos. AF and OIS may enhance the quality of the image.

BRIEF SUMMARY OF THE INVENTION

An optical system includes an optical module with a main axis is provided. The optical module includes a fixed portion, a movable portion, and a driving mechanism. The movable portion is connected to an optical element and is movable relative to the fixed portion. The driving mechanism drives the movable portion to move relative to the fixed portion. When viewed along a direction that is parallel with the main axis, the fixed portion is a polygonal structure with a first side, a second side, a third side, and a fourth side. The first side is parallel with the third side, the second side is parallel with the fourth side, and the first side is not parallel with the second side.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
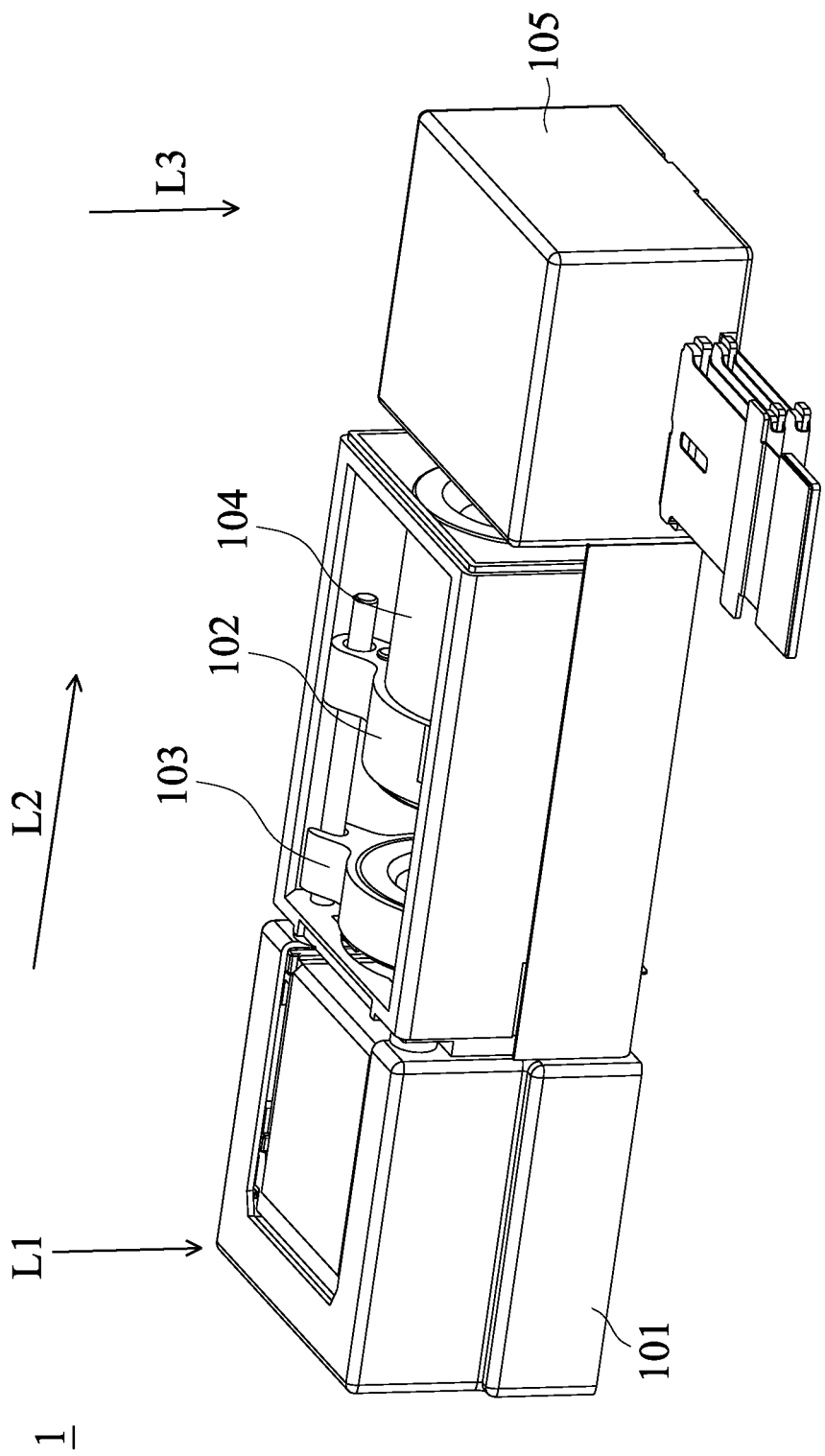
FIG. 1 is a perspective view of the optical system.
Figure 2:
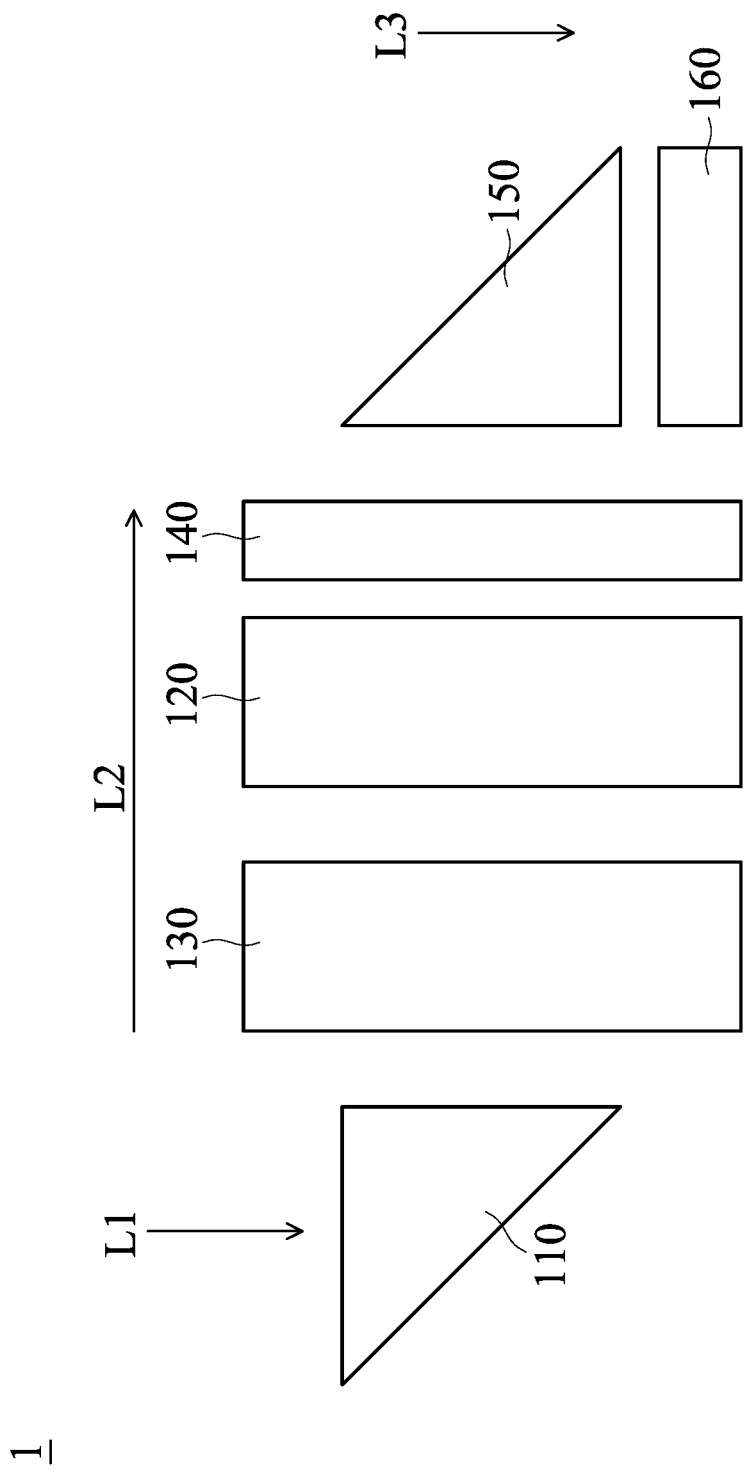
FIG. 2 is a schematic diagram of optical elements in the optical system.

According to some embodiments, an optical system 1 is provided. FIG. 1 is a perspective view of the optical system 1. FIG. 2 is a schematic diagram of the optical elements in the optical system 1. For simplicity, only the optical elements are shown in FIG. 2. The optical system 1 may be a periscope optical system. The optical system 1 includes a first optical module 101, a second optical module 102, a third optical module 103, a fourth optical module 104, and a fifth optical module 105.

Light above the first optical module 101 enters the first optical module 101 along a first incident direction L1, and is adjusted to pass through the third optical module 103, the second optical module 102, and the fourth optical module 104 sequentially along a second incident direction L2 by the first optical module 101, and the optical path of the light is adjusted to be along a third incident direction L3 in the fifth optical module 105, and imaging in the fifth optical module 105.

The first optical module 101 and the fifth optical module 105 may include a first optical element 111 and a fifth optical element 115, respectively. The first optical element 111 and the fifth optical element 115 may be a prism, a mirror, a refractive prism, or a beam splitter, etc. By rotating the first optical element 111 and the fifth optical element 115, the optical path of the light may be changed. The second optical module 102, the third optical module 103, and the fourth optical module 104 may respectively include a second optical element 112, a third optical element 113, and a fourth optical element 114. The second optical module 102, the third optical module 103, and the fourth optical module 104 may drive the second optical element 112, the third optical element 113, and the fourth optical element 114 respectively. The second optical element 112, the third optical element 113, and the fourth optical element 114 may be one or more lenses, optical lenses, etc., and are made of materials such as glass and resin. The fifth optical module 105 may also include a sixth optical element 116. The sixth optical element 116 may be an image sensor (or called a photosensitive element), etc., for example, a charge-coupled Device (CCD).

In some embodiments, an optical element corresponding to a focal length of the first optical element 111 that is not zero (not shown, for example, one or more lens, optical lens, etc.) may be provided above the first optical element 111. In other words, the optical element whose focal length is not zero may be fixedly connected to the first optical element 111, and arranged along the first incident direction L1 with the first optical element 111, and the shooting effect of the optical system 1 may be enhanced by increasing the quantity of the optical element.

In some embodiments, the first optical module 101 and the fifth optical module 105 may perform yawing and pitching, respectively. In some embodiments, the first optical module 101 may also perform pitching, and the fifth optical module 105 may perform yawing. In some embodiments, the first optical module 101 and the fifth optical module 105 may both perform pitching. In some embodiments, the first optical module 101 and the fifth optical module 105 may both perform yawing. In some embodiments, the second optical module 102 and the third optical module 103 may achieve the functions of zooming and auto focusing (AF), respectively. In some embodiments, the second optical module 102 may also perform auto focusing, and the third optical module 103 may perform zooming. In other words, terms such as yawing, pitching, zooming, and auto focusing, etc., do not constitute limitations.

In some embodiments, the fourth optical module 104 may achieve the function of Optical Image Stabilization (OIS). In some embodiments, the position of the fourth optical module 104 may be changed, for example, the fourth optical module 104 is disposed between the third optical module 103 and the fifth optical module 105. In some embodiments, the fourth optical module 104 may be integrated into the second optical module 102 or the third optical module 103, and the functions of auto focusing and optical image stabilization may be simultaneously achieved through a single second optical module 102 or a single third optical module 103. In some embodiments, the fourth optical module 104 may be omitted.

Figure 3:
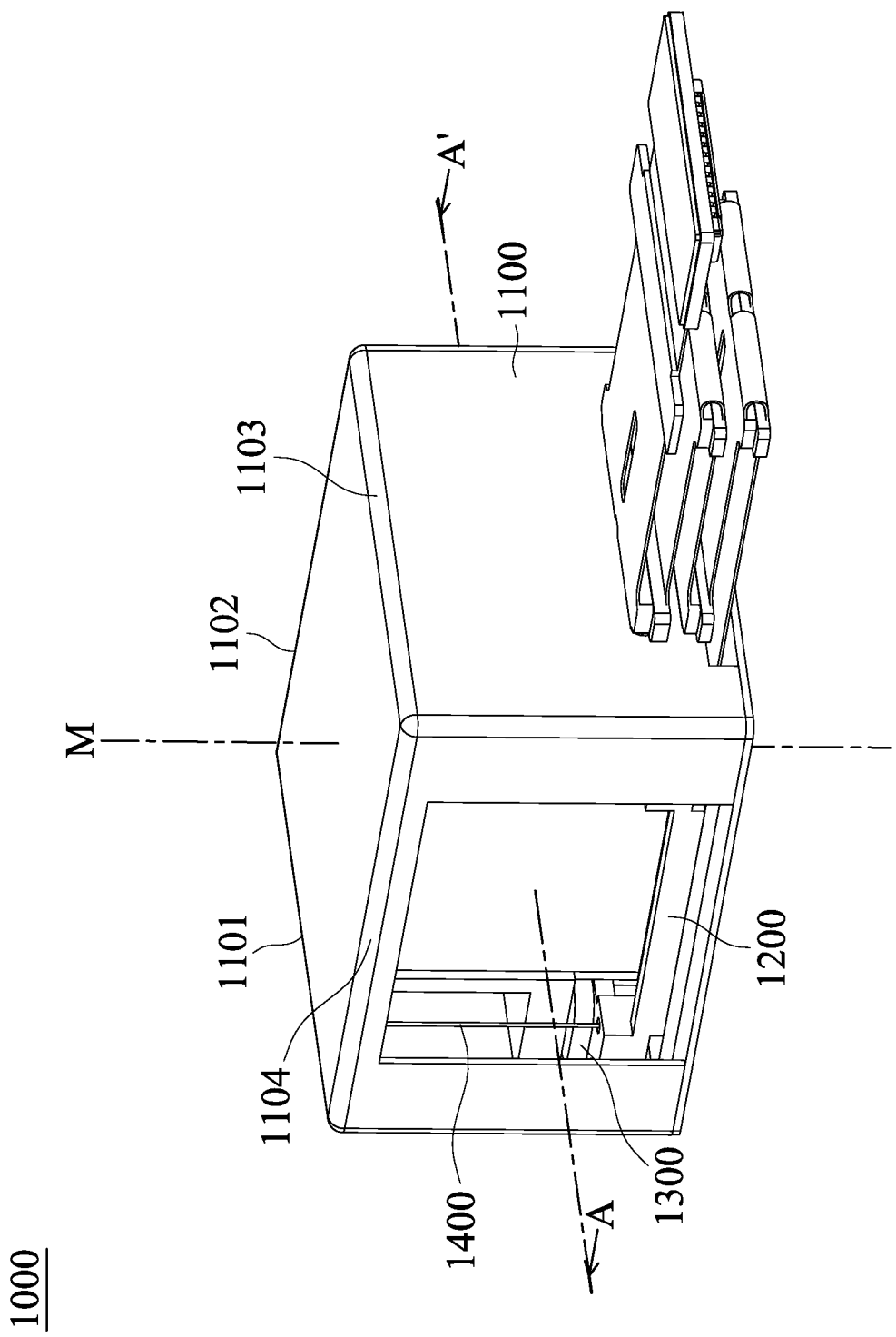
FIG. 3 is a perspective view of an optical module according to an embodiment of the disclosure.
Figure 4:
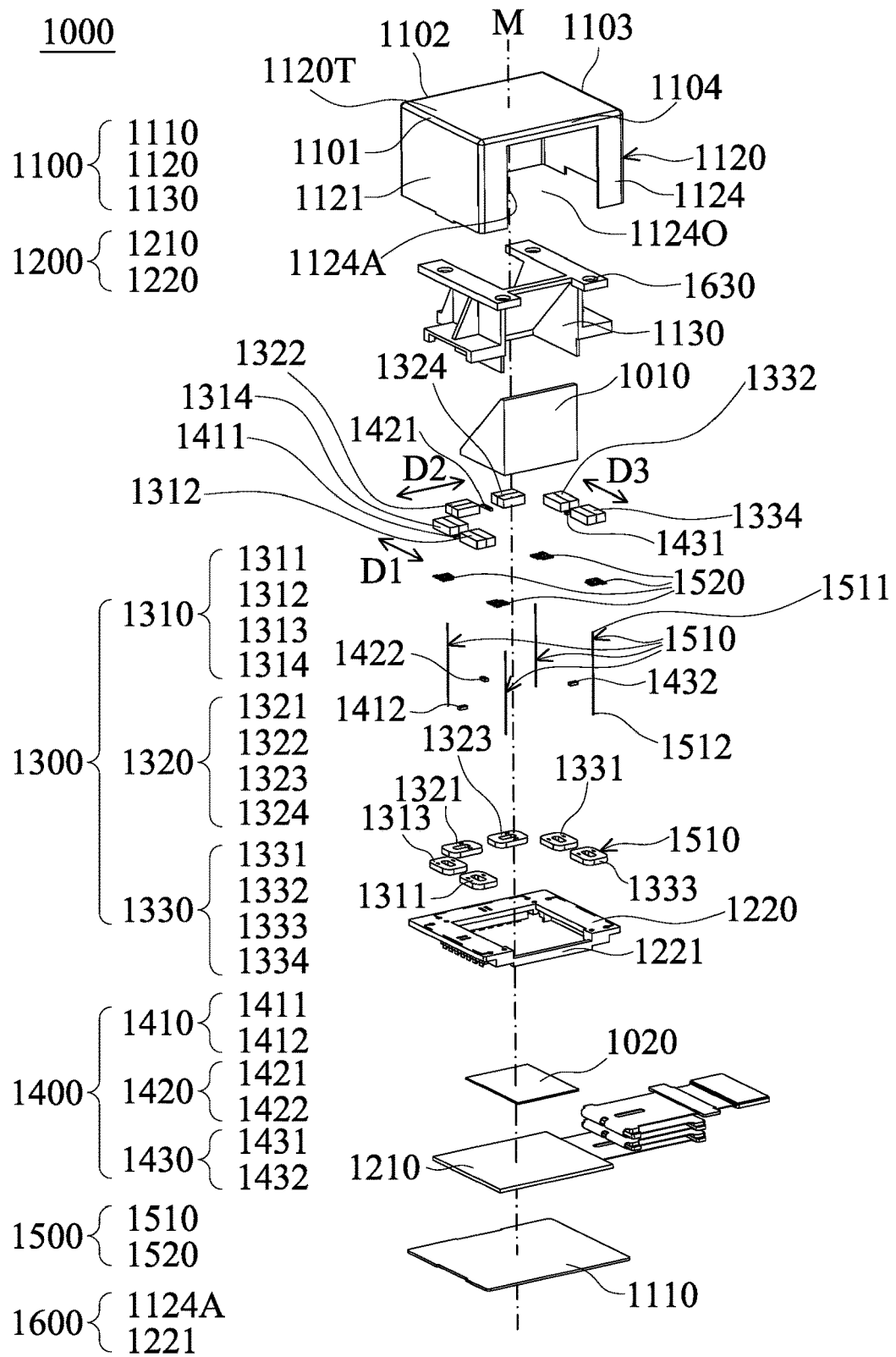
FIG. 4 is an exploded view of the optical module according to an embodiment of the disclosure.
Figure 5:
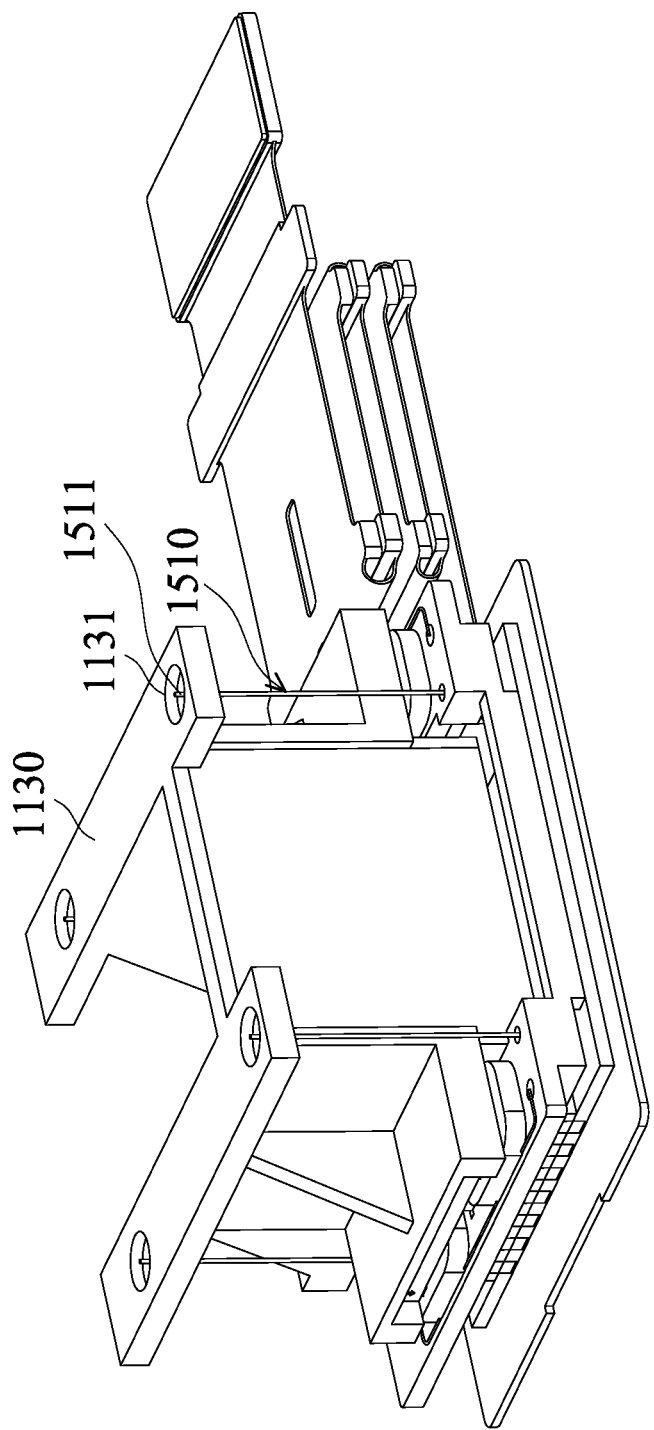
FIG. 5 is a perspective view of a partial structure of the optical module according to an embodiment of the disclosure.
Figure 6:
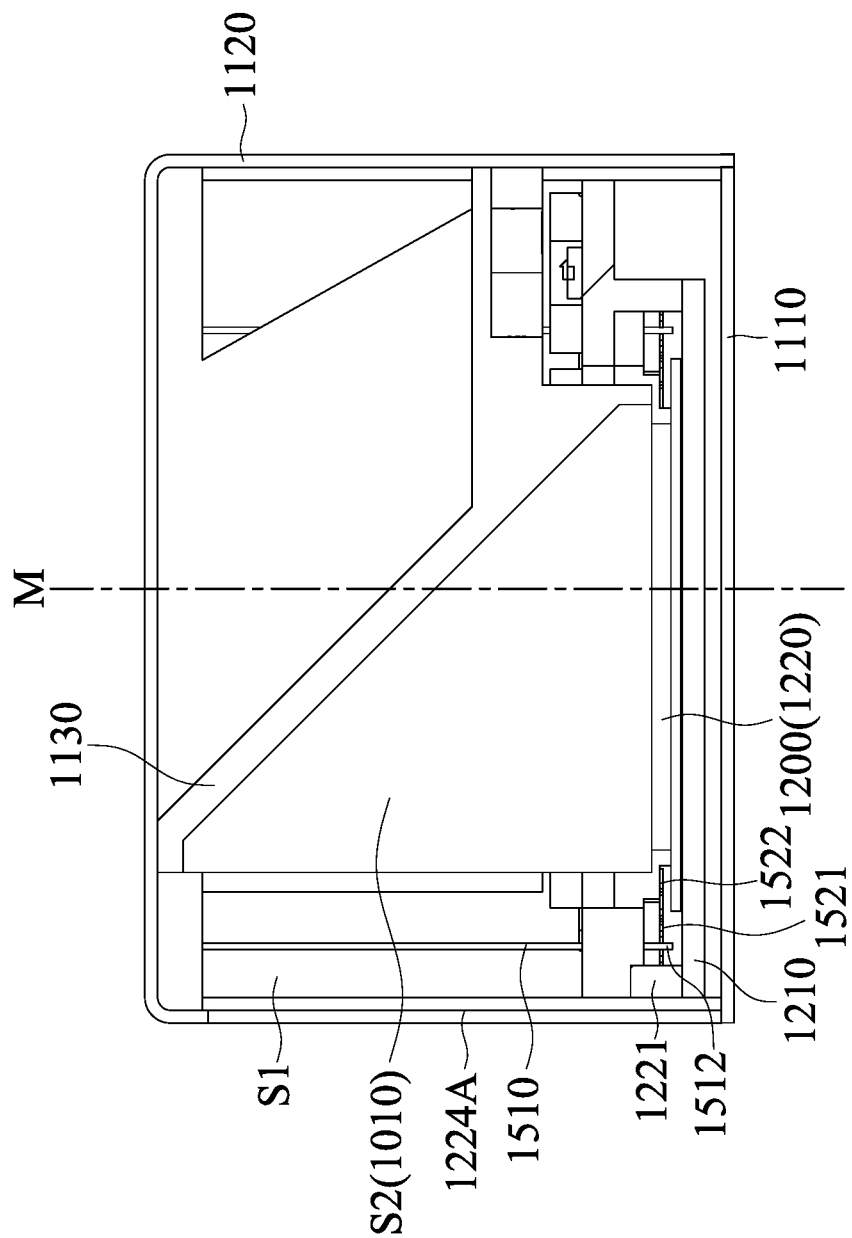
FIG. 6 is a cross-sectional view of the optical module taken along the line A-A' in FIG. 3.

Refer to FIG. 3 to FIG. 6. FIG. 3 is a perspective view of an optical module 1000 according to an embodiment of the present disclosure. FIG. 4 is an exploded view of the optical module 1000 according to an embodiment of the disclosure. FIG. 5 is a perspective view a partial structure of the optical module 1000 according to an embodiment of the disclosure. FIG. 6 is a cross-sectional view of the optical module 1000 taken along the line A-A' in FIG. 3. In the following embodiments, the optical module 1000 has a similar structure to the fifth optical module 105 described above. The optical module 1000 has a main axis M, and includes an optical path adjustment element 1010, an optical element 1020, a fixed portion 1100, a movable portion 1200, a driving mechanism 1300, a position sensing module 1400, a supporting assembly 1500, and a stopping assembly 1600.

The optical path adjustment element 1010 has a structure similar to the fifth optical element 115 mentioned above. In some embodiments, the optical path adjustment element 1010 is a right-angle prism, but is not limited to this. The optical element 1020 has a structure similar to the sixth optical element 116 mentioned above. In some embodiments, the optical element 1020 is an image sensor, but is not limited to this.

When viewed along a direction that is parallel with the main axis M, the fixed portion 1100 is a polygonal structure with a first side 1101, a second side 1102, a third side 1103 and a fourth side 1104. The first side 1101 is parallel with the third side 1103, the second side 1102 is parallel with the fourth side 1104, and the first side 1101 and the second side 1102 are not parallel.

As shown in FIG. 4 and FIG. 5, the fixed portion 1100 includes a base 1110, an outer frame 1120, and a frame 1130. The base 1110 has a plate-like structure and is perpendicular to the main axis M. The outer frame 1120 and the base 1110 are arranged along the main axis M. The outer frame 1120 includes a top wall 1120T, a first side wall 1121, a second side wall 1122, a third side wall 1123, and a fourth side wall 1124. The top wall 1110T has a plate-like structure and is not parallel with the main axis M. In more detail, the top wall 1121T is parallel with the base 1110. The first side wall 1121 extends from an edge of the top wall 1120T and is not parallel with the top wall 1120T. When viewed along a direction that is parallel with the main axis M, the first side wall 1121 is disposed on the first side 1101. The second side wall 1122 extends from an edge of the top wall 1120T and is not parallel with the top wall 1120T. When viewed along a direction that is parallel with the main axis M, the second side wall 1122 is disposed on the second side 1102. The third side wall 1123 extends from an edge of the top wall 1120T and is not parallel with the top wall 1120T. When viewed along a direction that is parallel with the main axis M, the third side wall 1123 is disposed on the third side 1103. The fourth side wall 1124 extends from an edge of the top wall 1120T and is not parallel with the top wall 1120T. It has an opening 11240 corresponding to the incident light L. The opening 11240 is disposed between the outer frame 1120 and the base 1110. When viewed along a direction that is parallel with the main axis M, the fourth side wall 1124 is disposed on the fourth side 1104.

As shown in FIG. 6, the base 1110 and the outer frame 1120 form a first accommodating space S1. The first accommodating space S1 accommodates the movable portion 1200 and the frame 1130. There is a second accommodating space S2 between the frame 1130 and the movable portion 1200 for accommodating the optical path adjustment element 1010. Although in this embodiment, the frame 1130 is connected and fixed to the outer frame 1120, and the optical path adjustment element 1010 is connected and fixed to the frame 1130, it is not limited to this. In some embodiments, the frame 1130 may be included in the movable portion 1200, and the frame 1130 and the optical path adjustment element 1010 may move relative to the fixed portion 1100.

As shown in FIG. 4 and FIG. 6, the movable portion 1200 is connected to the optical element 1020 and may move relative to the fixed portion 1100. The movable portion 1200 includes a pedestal 1210 and a holder 1220. The pedestal 1210 is connected to the optical element 1020 and has a plate-like structure. The holder 1220 is fixedly disposed on the pedestal 1210, and has a shielding portion 1221, which is arranged near the fourth side 1104. In more detail, when viewed along a direction that is parallel with the main axis M, the light enters the optical module 1000 from the fourth side 1104, and enters the optical element 1020 through the optical path adjustment element 1010. The optical path adjustment element 1010 is configured to adjust the light traveling in the direction that is parallel with the first side 1101 to travel in a direction that is parallel with the main axis M. The shielding portion 1221 is a protruding structure which protrudes along a direction that is parallel with the main axis M. When viewed along the direction that is parallel with the first side 1101, the shielding portion 1221 and the optical element 1020 at least partially overlap, so a stray light may be shielded, and the stray light may not enter the optical element 1020.

The shielding portion 1221 may also be used as a stopping portion 1221. An inner side wall located on the fourth side 1104 and close to the stopping portion 1221 may be used as a stopping surface 1124A, so the stopping portion 1221 and the stopping surface 1124A may form a stopping assembly 1600 configured to restrict the movable portion 1200 to move within a moving range relative to the fixed portion 1100. In more detail, when the stopping portion 1221 touches the stopping surface 1124A, the movable portion 1200 stops moving, so the movable portion 1200 moving along a direction that is not parallel with the main axis M may be restricted within a moving range relative to the fixed portion 1100.

The supporting assembly 1500 is connected to the movable portion 1200 and the fixed portion 1100. The supporting assembly 1500 includes a first elastic element 1510 and a second elastic element 1520. The first elastic element 1510 is a long strip structure extending along a direction that is parallel with the main axis M, and has a first end portion 1511 and a second end portion 1512. The first end portion 1511 is fixed to the frame 1130, and the second end portion 1512 is connected to the second elastic element 1520. The second elastic element 1520 is a plate-like structure, which is not parallel with the first elastic element 1510, and has an impact absorbing portion 1521 and a fixed end portion 1522. The impact absorbing portion 1521 is connected to the second end portion 1512. The impact absorbing portion 1521 absorbs the impact of the first elastic element 1510. The fixed end portion 1522 is fixed to the holder 1220. Therefore, the second elastic element 1520 is contacted to the holder 1220, and does not directly contact the pedestal 1210. When viewed along a direction that is perpendicular to the main axis M, the second elastic element 1520 is located between the pedestal 1210 and the holder 1220. When viewed along a direction that is parallel with the main axis M, the first elastic element 1510, the pedestal 1210 and the holder 1220 at least partially overlap.

The driving mechanism 1300 drives the movable portion 1200 to move relative to the fixed portion 1100. The driving mechanism 1300 includes a first driving assembly 1310, a second driving assembly 1320, and a third driving assembly 1330. The first driving assembly 1310 is disposed on the first side 1101, and includes a first coil 1311, a first magnetic element 1312, a second coil 1313, and a second magnetic element 1314. The first magnetic element 1312 corresponds to the first coil 1311, and the first coil 1311 and the first magnetic element 1312 are arranged along a direction that is parallel with the main axis M. The second coil 1313 and the first coil 1311 are arranged along a first direction D1, and the first direction D1 is parallel with the first side 1101. The second magnetic element 1314 corresponds to the second coil 1313, and the second magnetic element 1314 and the first magnetic element 1312 are arranged along the first direction D1. The second driving assembly 1320 is disposed on the second side 1102, and includes a third coil 1321, a third magnetic element 1322, a fourth coil 1323, and a fourth magnetic element 1324. The third magnetic element 1322 corresponds to the third coil 1321, and the third coil 1321 and the third magnetic element 1322 are arranged along a direction that is parallel with the main axis M. The fourth coil 1323 and the third coil 1321 are arranged along the second direction D2, and the second direction D2 is parallel with the second side 1102. The fourth magnetic element 1324 corresponds to the fourth coil 1323. The third driving assembly 1330 is disposed on the third side 1103, and includes a fifth coil 1331, a fifth magnetic element 1332, a sixth coil 1333, and a sixth magnetic element 1334. The fifth magnetic element 1332 corresponds to the fifth coil 1331, and the fifth coil 1331 and the fifth magnetic element 1332 are arranged along a direction that is parallel with the main axis M. The sixth coil 1333 and the fifth coil 1331 is arranged along a third direction D3, and the third direction D3 is parallel with the third side 1103. The sixth magnetic element 1334 corresponds to the sixth coil 1333. A winding axis of the second coil 1313 is parallel with a winding axis of the first coil 1311. The winding axis of the first coil 1311 is parallel with the main axis M. A winding axis of the fourth coil 1323 is parallel with a winding axis of the third coil 1321. The winding axis of the fourth coil 1323 is parallel with the main axis M. A winding axis of the sixth coil 1333 is parallel with a winding axis of the fifth coils 1331. The winding axis of the sixth coil 1333 is parallel with the main axis M. When viewed along a direction that is parallel with the main axis M, the driving mechanism 1300 is not disposed on the fourth side 1104. The driving assembly is at least partially fixedly disposed on the holder 1220.

In the embodiment of FIG. 4, the first coil 1311, the second coil 1313, the third coil 1321, the fourth coil 1323, the fifth coil 1331, and the sixth coil 1333 are disposed on the holder 1220 of the movable portion 1200, the first magnetic element 1312, the second magnetic element 1314, the third magnetic element 1322, the fourth magnetic element 1324, the fifth magnetic elements 1332, and the sixth magnetic element 1334 are disposed on the frame 1130 of the fixed portion 1100, but not limited to this. In some embodiments, the first coil 1311, the second coil 1313, the third coil 1321, the fourth coil 1323, the fifth coil 1331, and the sixth coil 1333 are disposed on the frame 1130 of the fixed portion 1100, and the first magnetic element 1312, the second magnetic element 1314, the third magnetic element 1322, the fourth magnetic element 1324, the fifth magnetic element 1332, and the sixth magnetic element 1334 are disposed on the holder 1220 of the movable portion 1200.

In addition, in the embodiment of FIG. 4, the first driving assembly 1310, the second driving assembly 1320, and the third driving assembly 1330 respectively include two magnetic elements, but it is not limited to this. In some embodiments, the first magnetic element 1312 and the second magnetic element 1314 have an integrally formed structure, the third magnetic element 1322 and the fourth magnetic element 1324 have an integrally formed structure, and the fifth magnetic element 1332 and the sixth magnetic element 1334 have an integrally formed structure.

The position sensing module 1400 is configured to sense the movement of the movable portion 1200 relative to the fixed portion 1100, and includes a first position sensing assembly 1410, a second position sensing assembly 1420, and a third position sensing assembly 1430. The first position sensing assembly 1410 has a first reference element 1411 and a first sensing element 1412, and the first sensing element 1412 is configured to sense a first magnetic field generated by the first reference element 1411. When viewed along a direction that is parallel with the main axis M, the first sensing element 1412 and the first reference element 1411 are disposed on the first side 1101. The second position sensing assembly 1420 has a second reference element 1421 and a second sensing element 1422, and the second sensing element 1422 is configured to sense the second magnetic field generated by the second reference element 1421. When viewed along a direction that is parallel with the main axis M, the second sensing element 1422 and the second reference element 1421 are disposed on the second side 1102. The third position sensing assembly 1430 has a third reference element 1431 and a third sensing element 1432. The third sensing element 1432 is configured to sense a third magnetic field generated by the third reference element 1431. When viewed in a direction that is parallel with the main axis M, the third sensing element 1432 and the third reference element 1431 are disposed on the third side 1103. When viewed along a direction that is parallel with the main axis M, the position sensing module 1400 is not disposed on the fourth side 1104.

In the embodiment of FIG. 4, the first reference element 1411, the second reference element 1421, and the third reference element 1431 are respectively magnetic elements, which are disposed on the frame 1130. When viewed along a direction that is perpendicular to the main axis M, the first reference element 1411 is disposed between the first magnetic element 1312 and the second magnetic element 1314, the second reference element 1421 is disposed between the third magnetic elements 1322 and the fourth magnetic element 1324, the third reference element 1431 is arranged between the fifth magnetic element 1332 and the sixth magnetic element 1334. The first sensing element 1412, the second sensing element 1422, and the third sensing element 1432 may be, for example, a Hall effect sensor, a magnetoresistive (MR) sensor, or a Fluxgate, etc. The first sensing element 1412, the second sensing element 1422, and the third sensing element 1432 are disposed on the holder 1220. When viewed along a direction that is perpendicular to the main axis M, the first sensing element 1412 is disposed between the first coil 1311 and the second coil 1313, the second sensing element 1422 is located between the third coil 1321 and the fourth coil 1323, and the third sensing element 1432 is located between the fifth coil 1331 and the sixth coil 1333 to respectively sense the first magnetic field of the first reference element 1411, the second magnetic field of the second reference element 1421, and the third magnetic field of the third reference element 1431 to obtain the position of the holder 1220 relative to the frame 1130.

In the embodiment of FIG. 4, three sets of position sensing assemblies are provided (a first position sensing assembly 1410, a second position sensing assembly 1420, and a third position sensing assembly 1430) to sense the movement and rotation of the movable portion 1200 relative to the fixed portion 1100, but not limited to this. In some embodiments, only two sets of position sensing assemblies that are not parallel with each other may be provided to sense the movement of the movable portion 1200 relative to the fixed portion 1100.

Figure 7:
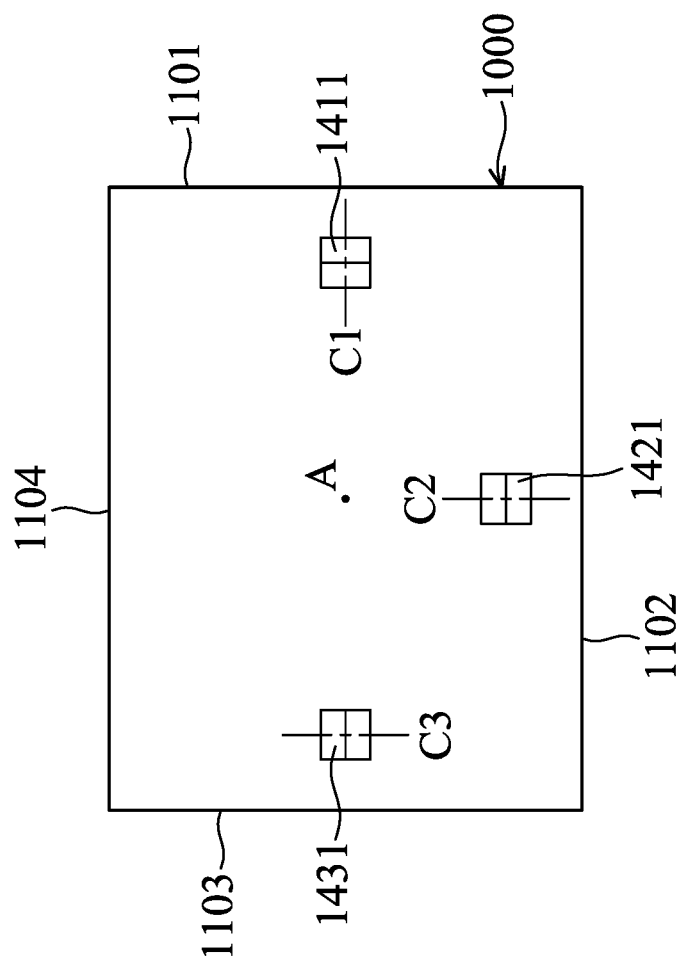
FIG. 7 is a schematic diagram of the configuration of reference elements in an optical module according to an embodiment of the disclosure.

Please refer to FIG. 7. FIG. 7 is a schematic diagram of the configuration of the reference elements in the optical module 1000 according to an embodiment of the present disclosure. In some embodiments, the driving mechanism 1300 may drive the movable portion 1200 to rotate relative to the fixed portion 1100 around a rotating axis A, and the rotating axis A is parallel with the main axis M. As mentioned above, the reference elements (the first reference element 1411, the second reference element 1421, and the third reference element 1431) are magnetic elements, and the first reference element 1411, the second reference element 9-1421 and the third reference element 1431 respectively have a first N-pole and a first S-pole. The first reference element 1411 has a first line C1, and the first line C1 is an imaginary line between the center of the first N-pole of the first reference element 1411 and the center of the S-pole of the first reference element 1411. The second reference element 1421 has a second line C2, and the second line C2 is an imaginary line between the center of the first N-pole of the second reference element 1421 and the center of the S-pole of the second reference element 1421. The third reference element 1431 has a third line C3, and the third line C3 is an imaginary line between the center of the first N-pole of the third reference element 1431 and the center of the S-pole of the third reference elements 1431. When viewed along a direction that is parallel with the main axis M, the rotating axis A does not overlap with the first reference element 1411, the second reference element 1421, and the third reference element 1431. In some embodiments, when viewed along a direction that is parallel with the main axis M, at least one of the first line C1, the second line C2, and the third line C3 does not pass through the rotating axis A. In other embodiments, when viewed along a direction that is parallel with the main axis M, at least two of the first line C1, the second line C2, and the third line C3 pass through the rotating axis A.

In the embodiment shown in FIG. 7, the third line C3 does not pass through the rotating axis A. One reference element is disposed to make the imaginary line does not pass the rotating axis A to sense the rotation of the movable portion 1200 relative to the fixed portion 1100, and the other two reference elements are disposed to make the imaginary lines pass the rotating axis A to respectively sense the movement of the movable portion 1200 relative to the fixed portion 1100 in two different directions. But it is not limited to this. Three reference elements may be disposed to make the imaginary lines to pass through the rotating axis A, and the measured values of the three reference elements may be calculated to obtain the rotation of the movable portion 1200 relative to the fixed portion 1100.

Therefore, it can be seen from the above that the configuration between the magnetic element, the coil, the reference element, and the sensing element may include various combinations in addition to the embodiment shown in FIG. 4. Then please refer to FIG. 8 to FIG. 12, and several examples are illustrated. FIG. 8 to FIG. 12 are schematic diagrams of a partial structure of an optical module 1000 according to another embodiment of the present disclosure. Although FIG. 8 to FIG. 12 only show a partial structure of the first side 1101, the similar elements in the second side 1102 and the third side 1103 may also have the same configuration.

Figure 8:
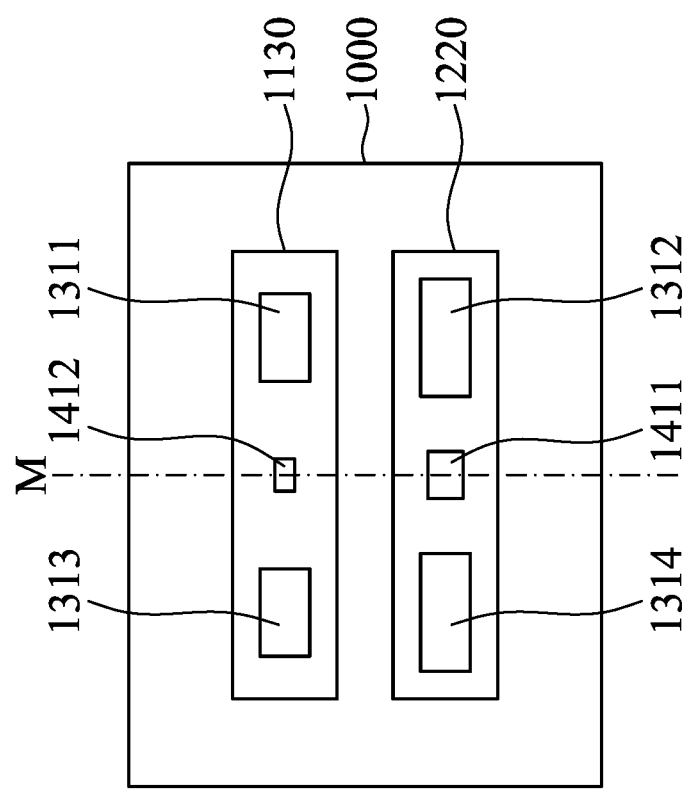
FIG. 8 is a schematic diagram of a partial structure of an optical module according to another embodiment of the disclosure.

In the example of FIG. 8, it has a similar configuration to FIG. 4, except that the first sensing element 1412, the first coil 1311 and the second coil 1313 are disposed on the frame 1130, the first reference element 1411, the first magnetic element 1312, and the second magnetic element 1314 are disposed on the holder 1220.

Figure 9:
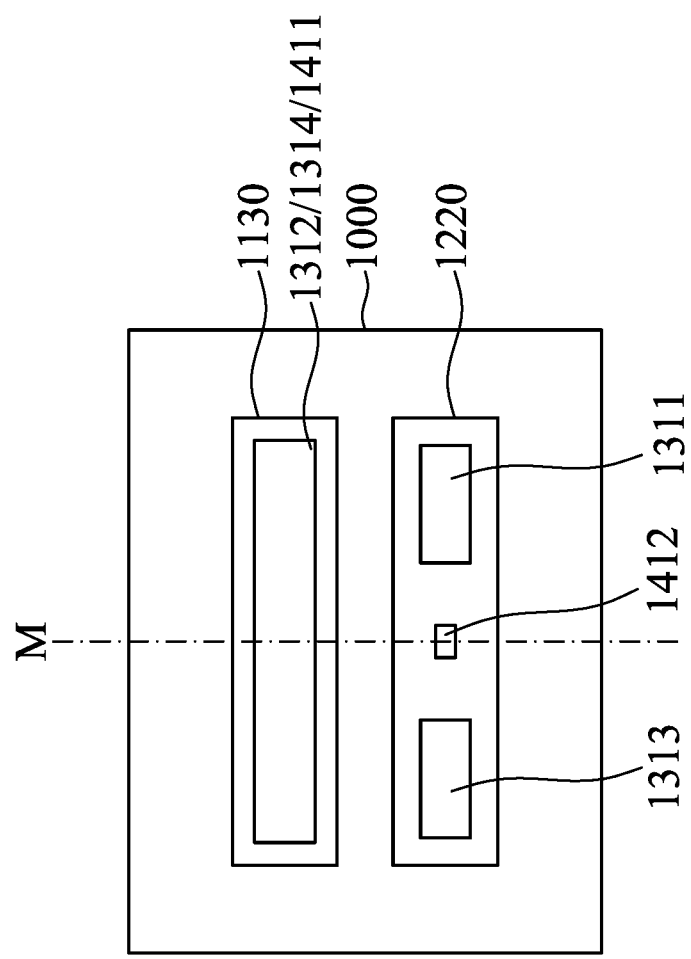
FIG. 9 is a schematic diagram of a partial structure of an optical module according to another embodiment of the disclosure.
Figure 10:
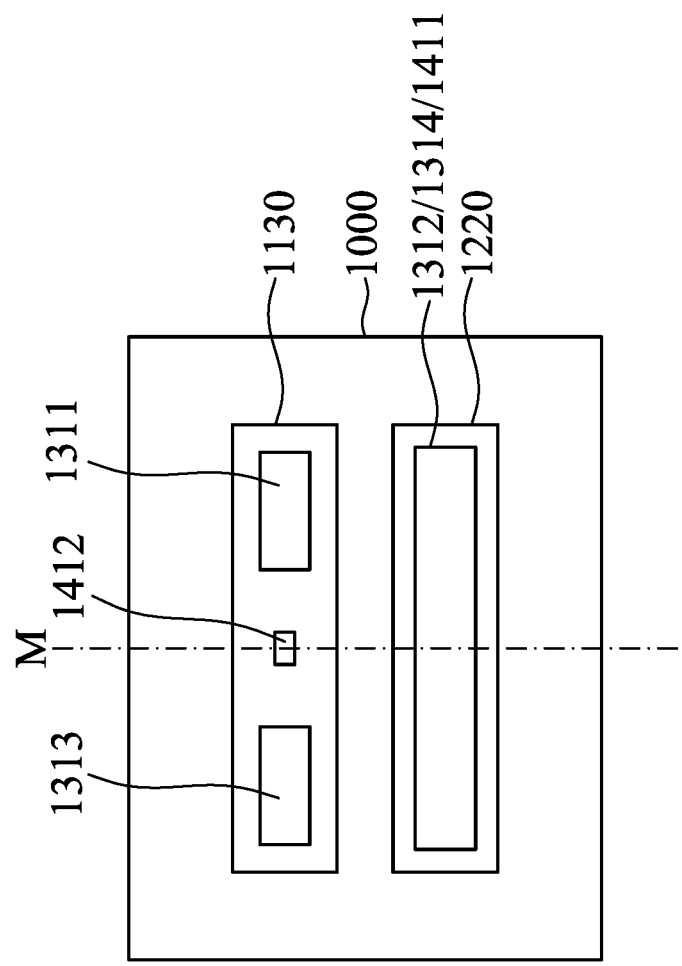
FIG. 10 is a schematic diagram of a partial structure of an optical module according to another embodiment of the disclosure.

In the examples of FIG. 9 and FIG. 10, the first reference element 1411, the first magnetic element 1312, and the second magnetic element 1314 have an integrally formed structure. That is, the magnetic element may also be used as a reference element at the same time.

In the example of FIG. 9, the first reference element 1411 (the first magnetic element 1312/the second magnetic element 1314) is disposed on the frame 1130, and the first sensing element 1412, the first coil 1311, and the second coil 1313 are disposed on the holder 1220. In the example of FIG. 10, the first reference element 1411 (the first magnetic element 1312/the second magnetic element 1314) is disposes on the holder 1220, and the first sensing element 1412, the first coil 1311, and a second coil 1313 are disposed on the frame 1130.

Figure 11:
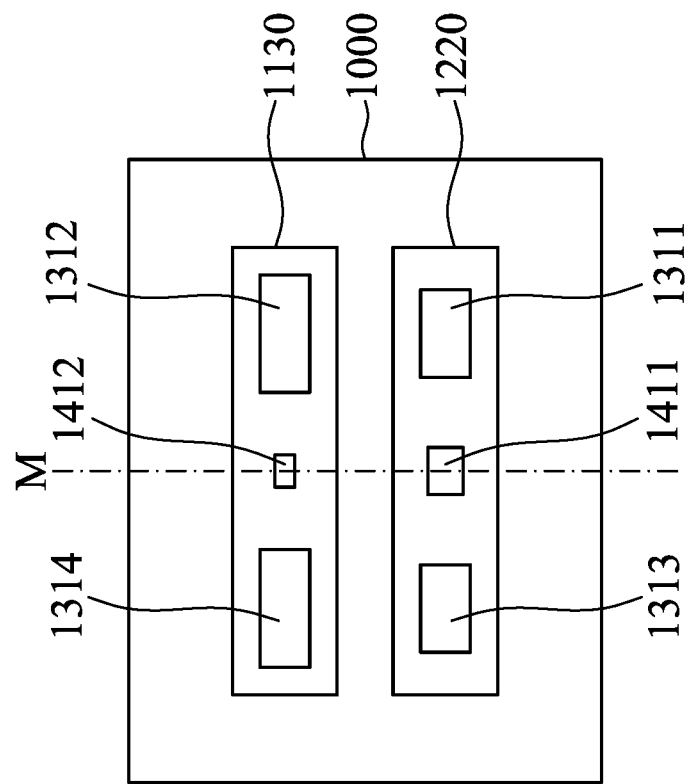
FIG. 11 is a schematic diagram of a partial structure of an optical module according to another embodiment of the disclosure.
Figure 12:
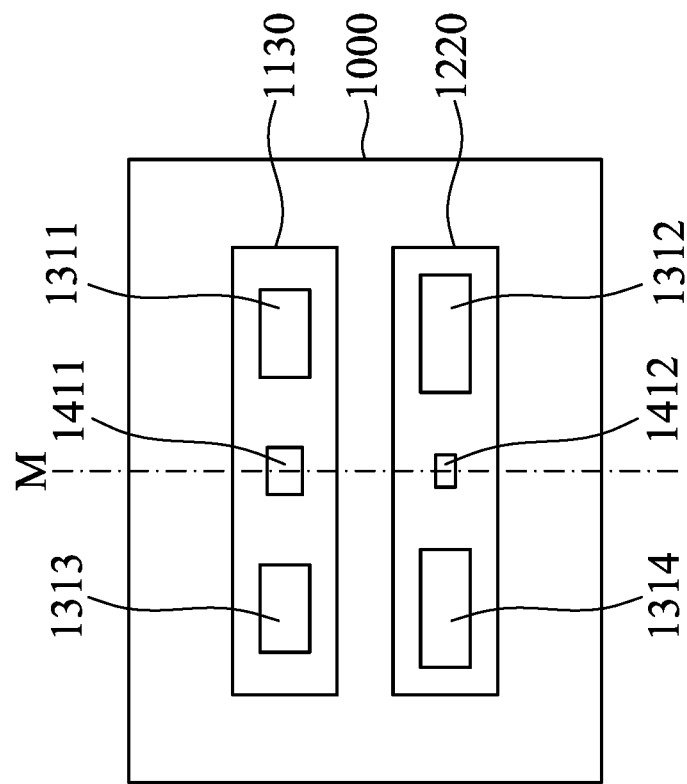
FIG. 12 is a schematic diagram of a partial structure of an optical module according to another embodiment of the disclosure.

In the examples in FIG. 11 and FIG. 12, when viewed along a direction that is perpendicular to the main axis M, the first sensing element 1412 and the first magnetic element 1312 at least partially overlap, and the first reference element 1411 and the first coil 1311 at least partially overlap. That is, the first sensing element 1412 is disposed between the first magnetic element 1312 and the second magnetic element 1314, and the first reference element 1411 is disposed between the first coil 1311 and the second coil 1313.

In the example of FIG. 11, the first sensing element 1412, the first magnetic element 1312, and the second magnetic element 1314 are disposed on the frame 1130, and the first reference element 1411, the first coil 1311, and the second coil 1313 are disposed on the holder 1220. In the example of FIG. 12, the first sensing element 1412, the first magnetic element 1312, and the second magnetic element 1314 are disposed on the holder 1220, and the first reference element 1411, the first coil 1311, and the second coil 1313 are disposed on the frame 1130.

The above-mentioned example with the position sensing module 1400 is driven by a closed-loop control. That is, the position sensing module 1400 is used to sense whether the movable portion 1200 reaches the expected position, and if it does not reach the expected position, a command may be made by a controller of the driving mechanism 1300 to make corrections until the movable portion 1200 reaches the expected position. However, the present disclosure is not limited to this. It may also be driven by an open-loop control without the position sensing module 1400 with the position feedback, and by establishing a database in advance, then the movable portion 1200 may be driven directly to the expected position.

Figure 13:
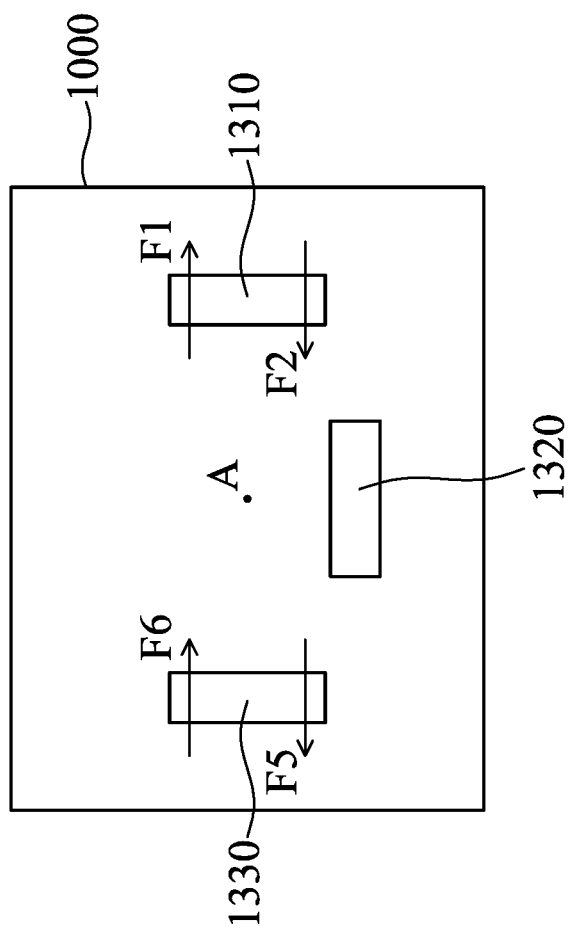
FIG. 13 is a schematic diagram of a partial structure of an optical module according to an embodiment of the disclosure.
Figure 14:
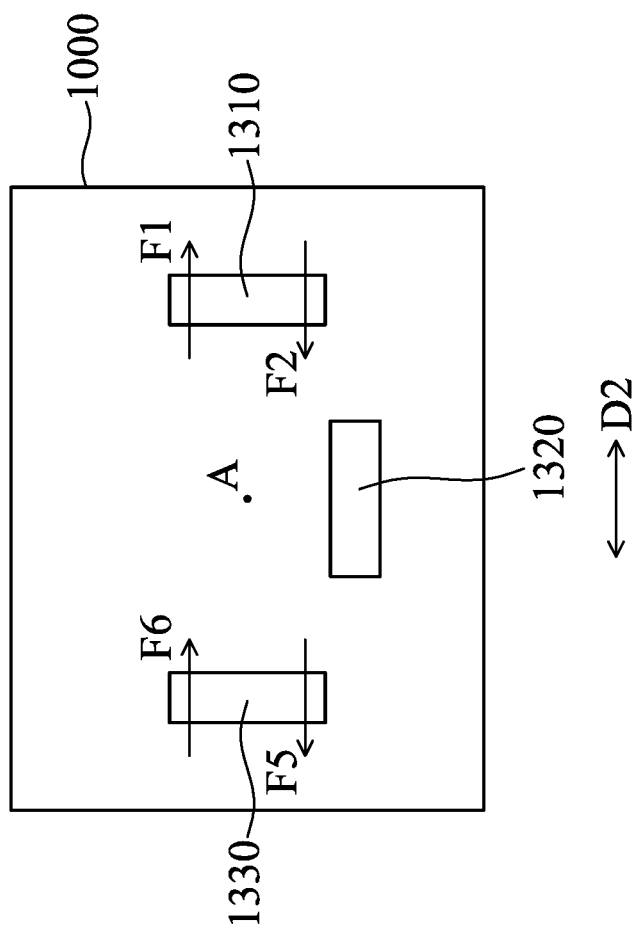
FIG. 14 is a schematic diagram of a partial structure of an optical module according to an embodiment of the disclosure.
Figure 15:
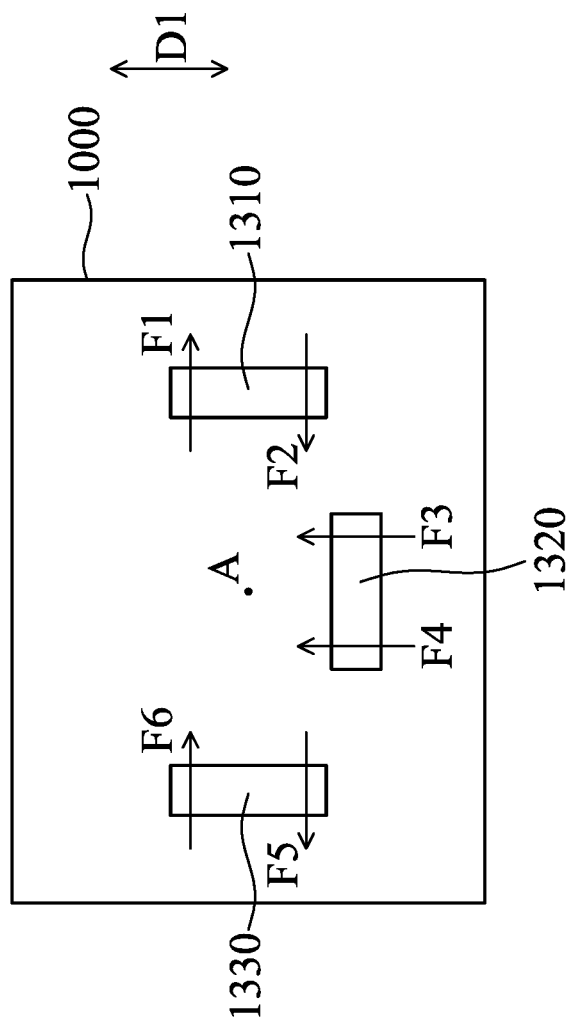
FIG. 15 is a schematic diagram of a partial structure of an optical module according to an embodiment of the disclosure.

Next, refer to FIG. 13 to FIG. 15, and the operation of the driving mechanism is described as the following. FIG. 13 to FIG. 15 are schematic diagrams of a partial structure of the optical module 1000 according to an embodiment of the disclosure. In some embodiments, the first driving assembly 1310 is configured to drive the movable portion 1200 to move relative to the fixed portion 1100, and the first driving assembly 1310 is configured to drive the movable portion 1200 to rotates around the rotating axis A relative to the fixed portion 1100. The second driving assembly 1320 is configured to drive the movable portion 1200 to move relative to the fixed portion 1100, but the second driving assembly 1320 is not configured to drive the movable portion 1200 to rotate relative to the fixed portion 1100. The third driving assembly 1330 is configured to drive the movable portion 1200 to move relative to the fixed portion 1100, and the third driving assembly 1330 is configured to drive the movable portion 1200 to rotate relative to the fixed portion 1100.

The first driving assembly 1310 is configured to generate a first driving force F1 and a second driving force F2. The second driving assembly 1320 is configured to generate a third driving force F3 and a fourth driving force F4. The third driving assembly 1330 is configured to generate a fifth driving force F5 and a sixth driving force F6. When viewed along a direction that is parallel with the main axis M, the first driving force F1, the second driving force F2, the third driving force F3, the fourth driving force F4, the fifth driving force F5, and the sixth driving force F6 do not pass through the rotating axis A. The first driving force F1, the second driving force F2, and the third driving force F3, the fourth driving force F4, the fifth driving force F5, and the sixth driving force F6 are generated at different positions.

As shown in FIG. 13, the movable portion 1200 may move relative to the fixed portion 1100 by switching on different magnitude of current to the coil to generate a driving force between the coil and the magnetic element. That is, the first driving assembly 1310, the second driving assembly 1320, and the third driving assembly 1330 may be separately controlled to make the first driving force F1 and the second driving force F2 have the same magnitude and opposite directions, the fifth driving force F5 and the sixth driving force F6 have the same magnitude and opposite directions, the first driving force F1 and the fifth driving force F5 have the same magnitude, the second driving force F2 and the sixth driving force F6 have the same magnitude, the first driving force F1 and the sixth driving force F6 have the same direction, and the second driving force F2 and the fifth driving force F5 have the same direction, so that the movable portion 1200 is driven to rotate relative to the fixed portion 1100.

In another control mode, as shown in FIG. 14, the magnitude of the first driving force F1 and the magnitude of the second driving force F2 are different, the magnitude of the fifth driving force F5 and the magnitude of the sixth driving force F6 are different, the magnitude of the first driving force F1 is different from the magnitude of the fifth driving force F5, the magnitude of the second driving force F2 is different from the magnitude of the sixth driving force F6, the magnitude difference between the first driving force F1 and the second driving force F2 is the same as the magnitude difference between the fifth driving force F5 and the sixth driving force F6, so that the movable portion 1200 is driven to rotate relative to the fixed portion 1100 and simultaneously move in the second direction D2.

In addition, in another control mode, as shown in FIG. 15, the magnitude of the first driving force F1 and the magnitude of the second driving force F2 are different, the magnitude of the fifth driving force F5 and the magnitude of the sixth driving force F6 are different, the magnitude of the first driving force F1 and the magnitude of the fifth driving force F5 are different, the magnitude of the second driving force F2 and the magnitude of the sixth driving force F6 are different, and the magnitude of the third driving force F3 and the magnitude of the fourth driving force F4 are the same, so that the movable portion 1200 is driven to rotate relative to the fixed portion 1100 and move along the first direction D1 at the same time. Although some examples of the movement that the driving mechanism drives the movable portion relative to the fixed portion have disclosed above, it is not limited to this, and may be changed as required.

As described above, an embodiment of the present invention provides an optical system includes an optical module with a main axis. The optical module includes a fixed portion, a movable portion, and a driving mechanism. The movable portion is connected to an optical element and is moved relative to the fixed portion. The driving mechanism drives the movable portion to move relative to the fixed portion. When viewed along a direction that is parallel with the main axis, the fixed portion is a polygonal structure with a first side, a second side, a third side, and a fourth side, the first side is parallel with the third side, the second side is parallel with the fourth side, the first side is not parallel with the second side. The special position and size relationship of each element disclosed in the present invention may enable the optical element drive mechanism to achieve a specific direction of thinning and overall miniaturization. In addition, by applying with different optical modules, the optical element driving mechanism may further improve the optical quality (such as shooting quality or depth sensing accuracy, etc.).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical system, comprising:
    an optical module with a main axis, comprising;
        a fixed portion;
        a movable portion connected to an optical element, wherein the movable portion is movable relative to the fixed portion; and
        a driving mechanism driving the movable portion to move relative to the fixed portion,
    wherein when viewed along a direction that is parallel with the main axis, the fixed portion is a polygonal structure with a first side, a second side, a third side, and a fourth side, the first side is parallel with the third side, the second side is parallel with the fourth side, and the first side is not parallel with the second side,
    wherein the driving mechanism comprises:
        a first driving assembly disposed on the first side, comprising:
            a first coil;
            a first magnetic element corresponding to the first coil, wherein the first coil and the first magnetic element are arranged along the direction that is parallel with the main axis;
            a second coil arranged along a first direction with the first coil, wherein the first direction is parallel with the first side; and
            a second magnetic element corresponding to the second coil, wherein the second magnetic element and the first magnetic element are arranged along the first direction;
        a second driving assembly disposed on the second side, comprising:
            a third coil;
            a third magnetic element corresponding to the third coil, wherein the third coil and the third magnetic element are arranged along the direction that is parallel with the main axis;
            a fourth coil arranged along a second direction with the third coil, wherein the second direction is parallel with the second side; and
            a fourth magnetic element corresponding to the fourth coil; and
        a third driving assembly disposed on the third side, comprising:
            a fifth coil;
            a fifth magnetic element corresponding to the fifth coil, wherein the fifth coil and the fifth magnetic element are arranged along the direction that is parallel with the main axis;
            a sixth coil arranged along a third direction with the fifth coil, wherein the third direction is parallel with the third side; and
            a sixth magnetic element corresponding to the sixth coil,
    wherein a winding axis of the first coil is parallel with a winding axis of the second coil and the main axis,
    wherein a winding axis of the fourth coil is parallel with a winding axis of the third coil and the main axis, and
    wherein a winding axis of the sixth coil is parallel with a winding axis of the fifth coil and the main axis.

2. The optical system as claimed in claim 1, wherein when viewed along the direction that is parallel with the main axis, the driving mechanism is not disposed on the fourth side.

3. The optical system as claimed in claim 1, wherein the optical module further comprises an optical path adjustment element, and light enters the optical module through the optical path adjustment element, wherein the optical path adjustment element is configured to adjust a travel direction of the light from a direction that is parallel with the first side to the direction that is parallel with the main axis, and wherein when viewed along the direction that is parallel with the main axis, the light enters the optical module from the fourth side.

4. The optical system as claimed in claim 1, wherein the first magnetic element and the second magnetic element have an integrally formed structure, the third magnetic element and the fourth magnetic element have an integrally formed structure, and the fifth magnetic element and the sixth magnetic element have an integrally formed structure.

5. The optical system as claimed in claim 1, wherein the optical module further comprises a position sensing module configured to sense a movement of the movable portion relative to the fixed portion, wherein the position sensing module comprises:
    a first position sensing assembly, comprising:
        a first reference element; and
        a first sensing element configured to sense a first magnetic field generated by the first reference element, wherein when viewed along the direction that is parallel with the main axis, the first sensing element and the first reference element are disposed on the first side;
    a second position sensing assembly, comprising:
        a second reference element; and
        a second sensing element configured to sense a second magnetic field generated by the second reference element, wherein when viewed along the direction that is parallel with the main axis, the second sensing element and the second reference element are disposed on the second side; and
    a third position sensing assembly, comprising:
        a third reference element; and
        a third sensing element configured to sense a third magnetic field generated by the third reference element, wherein when viewed along the direction that is parallel with the main axis, the third sensing element and the third reference element are disposed on the third side.

6. The optical system as claimed in claim 5, wherein when viewed along the direction that is parallel with the main axis, the position sensing module is not disposed on the fourth side.

7. The optical system as claimed in claim 5, wherein the first reference element, the first magnetic element, and the second magnetic element have an integrally formed structure, the second reference element, the third magnetic element, and the fourth magnetic element have an integrally formed structure, and the first reference element, the fifth magnetic element, and the sixth magnetic element have an integrally formed structure.

8. The optical system as claimed in claim 5, wherein when viewed along a direction that is perpendicular to the main axis, the first sensing element is located between the first coil and the second coil, the second sensing element is located between the third coil and the fourth coil, and the third sensing element is located between the fifth coil and the sixth coil.

9. The optical system as claimed in claim 5, wherein when viewed along a direction that is perpendicular to the main axis, the first sensing element and the first magnetic element at least partially overlap, and the first reference element and the first coil at least partially overlap.

10. The optical system as claimed in claim 5, wherein the second sensing element and the second magnetic element at least partially overlap, the second reference element and the second coil at least partially overlap, the third sensing element and the third magnetic element at least partially overlap, and the third reference element and the third coil at least partially overlap.

11. The optical system as claimed in claim 5, wherein the driving mechanism drives the movable portion to rotate relative to the fixed portion around a rotating axis, and the rotating axis is parallel with the main axis, and wherein:
the first reference element, the second reference element, and the third reference element each have a first N-pole and a first S-pole;
the first reference element has a first line that is an imaginary line between a center of the first N-pole of the first reference element and a center of the first S-pole of the first reference element;
the second reference element has a second line that is an imaginary line between a center of the first N-pole of the second reference element and a center of the first S-pole of the second reference element;
the third reference element has a third line that is an imaginary line between a center of the first N-pole of the third reference element and a center of the first S-pole of the third reference element;
when viewed along the direction that is parallel with the main axis, the first line passes through the rotating axis, at least one of the first line, the second line, and the third line does not pass through the rotating axis, and at least two of the first line, the second line, and the third line pass through the rotating axis;
when viewed along the direction that is parallel with the main axis, the rotating axis does not overlap with the first reference element, the second reference element, and the third reference element.

12. The optical system as claimed in claim 5, wherein:
the first driving assembly is configured to drive the movable portion to move relative to the fixed portion;
the first driving assembly is configured to drive the movable portion to rotate around a rotating axis relative to the fixed portion;
the second driving assembly is configured to drive the movable portion to move relative to the fixed portion;
the second driving assembly is not configured to drive the movable portion to rotate relative to the fixed portion;
the third driving assembly is configured to drive the movable portion to move relative to the fixed portion;
the third driving assembly is configured to drive the movable portion to rotate relative to the fixed portion;
the first driving assembly is configured to generate a first driving force;
when viewed along the direction that is parallel with the main axis, the first driving force does not pass through the rotating axis;
the first driving assembly is configured to generate a second driving force;
when viewed along the direction that is parallel with the main axis, the second driving force does not pass through the rotating axis;
when viewed along a direction that is parallel with the rotating axis, the first driving force and the second driving force are generated at different positions;
the second driving assembly is configured to generate a third driving force;
when viewed along the direction that is parallel with the main axis, the third driving force does not pass through the rotating axis;
the second driving assembly is configured to generate a fourth driving force;
when viewed along the direction that is parallel with the main axis, the fourth driving force does not pass through the rotating axis;
when viewed along the direction that is parallel with the rotating axis, the third driving force and the fourth driving force are generated at different positions;
the third driving assembly is configured to generate a fifth driving force;
when viewed along the direction that is parallel with the main axis, the fifth driving force does not pass through the rotating axis;
the third driving assembly is configured to generate a sixth driving force;
when viewed along the direction that is parallel with the main axis, the sixth driving force does not pass through the rotating axis;
when viewed along the direction that is parallel with the rotating axis, the fifth driving force and the sixth driving force are generated at different positions.

13. The optical system as claimed in claim 12, wherein when the driving mechanism drives the movable portion to rotate relative to the fixed portion, the magnitude of the first driving force is different from the magnitude of the second driving force, the magnitude of the fifth driving force is different from the magnitude of the sixth driving force, the magnitude of the first driving force is the same as the magnitude of the fifth driving force, and the magnitude of the second driving force is the same as the magnitude of the sixth driving force.

14. The optical system as claimed in claim 12, wherein the direction of the first driving force is opposite to the direction of the second driving force, the direction of the fifth driving force is opposite to the direction of the sixth driving force, the direction of the first driving force is the same as the direction of the sixth driving force, and the direction of the second driving force is the same as the direction of the fifth driving force.

15. The optical system as claimed in claim 12, wherein when the driving mechanism drives the movable portion to rotate relative to the fixed portion and simultaneously move along the first direction, the magnitude of the first driving force is different from the magnitude of the second driving force, the magnitude of the fifth driving force is different from the magnitude of the sixth driving force, the magnitude of the first driving force is different from the magnitude of the fifth driving force, the magnitude of the second driving force is different from the magnitude of the sixth driving force, and the magnitude of the third driving force is the same as the magnitude of the fourth driving force.

16. The optical system as claimed in claim 12, wherein when the driving mechanism drives the movable portion to rotate relative to the fixed portion and simultaneously move along the second direction, the magnitude of the first driving force is different from the magnitude of the second driving force, the magnitude of the fifth driving force is different from the magnitude of the sixth driving force, the magnitude of the first driving force is different from the magnitude of the fifth driving force, the magnitude of the second driving force is different from the magnitude of the sixth driving force, and the magnitude difference between the first driving force and the second driving force is the same as the magnitude difference between the fifth driving force and the sixth driving force.

17. The optical system as claimed in claim 1, wherein the optical module further comprises:
   a stopping assembly configured to restrict the movable portion moving within a moving range relative to the fixed portion, wherein the stopping assembly comprises:
      a stopping portion; and
      a stopping surface, wherein the stopping portion and the stopping surface are configured to restrict the movable portion moving along a direction that is not parallel with the main axis within the moving range relative to the fixed portion; and
   a shielding portion configured to shield stray light so that stray light cannot enter the optical element, wherein the shielding portion has a protruding structure that protrudes along the direction that is parallel with the main axis.

18. The optical system as claimed in claim 17, wherein the fixed portion comprises:
   a base; and
   an outer frame, wherein the base and the outer frame are arranged along the main axis, and the base and the outer frame form an accommodating space for accommodating the movable portion, and
   wherein the outer frame comprises a first side wall disposed on the first side, a second side wall disposed on the second side, a third side wall disposed on the third side, and a fourth side wall disposed on the fourth side,
   and the fourth side wall comprises an opening corresponding to light entering the optical module.

19. The optical system as claimed in claim 18, wherein the stopping assembly is at least partially disposed on the fourth side wall, wherein the stopping assembly is at least partially disposed on the movable portion, wherein the stopping assembly is adjacent to the opening of the fourth side wall, wherein the shielding portion is fixedly connected to the movable portion, wherein the shielding portion and the movable portion have an integrally formed structure, wherein the stopping portion and the shielding portion have an integrally formed structure, and wherein when viewed along the direction that is parallel with the first side, the shielding portion and the optical element at least partially overlap.

* * * * *